United States Patent [19]

Fielder

[11] Patent Number: 5,201,038
[45] Date of Patent: Apr. 6, 1993

[54] ADDRESS BUS FOR STACKABLE COMPUTER BOARD CONNECTORS

[75] Inventor: Dennis A. Fielder, Linton, United Kingdom

[73] Assignee: Videologic Limited, Hertfordshire, United Kingdom

[21] Appl. No.: 785,177

[22] Filed: Oct. 30, 1991

Related U.S. Application Data

[63] Continuation of Ser. No. 446,925, Dec. 6, 1989, abandoned.

[51] Int. Cl.⁵ .............................................. G06F 13/00
[52] U.S. Cl. ..................... 395/325; 364/DIG. 21; 364/929.4; 364/929.5; 364/926.91; 364/926.9; 364/935.2; 364/949.4; 439/74
[58] Field of Search ............... 395/250, 325, 425, 500, 395/800; 439/74, 75, 43

[56] References Cited

U.S. PATENT DOCUMENTS

| | | | |
|---|---|---|---|
| 4,219,873 | 8/1980 | Kober et al. | 364/200 |
| 4,365,297 | 12/1982 | Grisham, Jr. | 364/200 |
| 4,366,539 | 12/1982 | Johnson et al. | 364/200 |
| 4,400,794 | 8/1983 | Koos | 364/900 |
| 4,604,689 | 8/1986 | Burger | 364/200 |
| 4,635,192 | 1/1987 | Ceccon et al. | 395/325 |
| 4,733,461 | 3/1988 | Nakano | 29/830 |
| 4,802,726 | 2/1989 | Palmquist et al. | 350/96.20 |

OTHER PUBLICATIONS

M. Kubota, "Stack Assembly of Printed Circuit Cards", IBM Technical Disclosure Bulletin, vol. 23, No. 12, May 1981.

*Primary Examiner*—Kevin A. Kriess
*Attorney, Agent, or Firm*—Flynn, Thiel, Boutell & Tanis

[57] ABSTRACT

A base board 10 carries four daughter cards 12a, 12b, 12c and 12d. Three of the daughter boards 12a, 12b, 12c are stacked on the front side of the base board 10, and the fourth daughter board 12d is carried on the rear side of the base board 10. Modifying means are provided on the daughter cards for modifying addresses sent from the base card to the daughter cards. This allows the daughter cards 12 to be identical, and still enables individual addressing of the daughter boards according to their position in the stack.

27 Claims, 7 Drawing Sheets

| ADDRESS | AREA | SELECT LINE |
|---|---|---|
| E800H | 4th DAUGHTER (12d) | DECA |
| E000H | 3rd DAUGHTER (12c) | DECA |
| C800H | BLANK | DECB |
| C000H | 2nd DAUGHTER (12b) | DECB |
| A800H | BLANK | DECC |
| A000H | 1st DAUGHTER (12a) | DECC |
| 9FFFH ... 0000H | BASE BOARD MEMORY | NONE |

ADDRESS BUS FOR STACKABLE COMPUTER BOARD CONNECTORS

This application is a continuation of U.S. Ser. No. 07/446 925, filed Dec. 6, 1989 now abandoned.

FIELD OF THE INVENTION

The present invention relates to the field of stackable connectors, and in particular to an address bus for stackable computer board connectors. The invention sees particular utility in expansion and connector ports to allow daughter boards to be connected to a computer motherboard.

BACKGROUND OF THE INVENTION

In a conventional arrangement of connectors for stackable computer boards, a common bus from a computer motherboard is routed directly through each of the stacked board connectors. Each daughter board contains a decoder programmed to recognise the occurrence on the bus of a unique address or a unique range of addresses assigned to the particular board. The motherboard can access any one of the daughter boards through the connectors by supplying an appropriate address to the bus.

This arrangement is inconvenient in that each daughter board must be different from the other daughter boards, being programmed to recognise different addresses from those recognised by the other boards. If this is not done, several daughter boards may respond to the same address, causing a conflict of data on the bus. Thus although the daughter boards may be of the same type and performing the same operations, they must be different to accommodate different unique addressing.

SUMMARY OF THE INVENTION

In the present invention a stackable board includes a first connector, a second connector, and a bus connecting the first connector to the second connector means on the bus between the first and second connectors is operable according to a predetermined algorithm such that the address information carried by signal lines of the bus at the second connector is different from that at the first connector. The board also includes an address decoder for decoding addresses on the bus at the first connector.

The first and second connectors may be carried on opposite front and rear sides of the board, to allow parallel stacking of boards.

Several such boards may be stacked together on a baseboard. The address modification means on each board modifies the address that each board communicates to the next board in the stack. Thus the address decoders do not each decode the same address, rather each decoder decodes a modified address received from an adjacent board in the stack. By choosing a suitable modification algorithm, the address decoders and hence the stackable boards can be made identical, each being automatically addressed by reference to its position in the stack.

Another feature of the invention is that the address lines in the bus include a number of exclusive select lines, for selecting access to the boards in the stack. On each board, one of the select lines is fed to an enable control input of the address decoder. When the select line is active, the address decoder is enabled to perform address decoding. The modification algorithm rotates the select lines logically through one position. By logical rotation, the order of the select lines is altered. A rotation network includes a number of ordered input lines and the same number of output lines. For rotation by one position in one direction, the first input is coupled to the second output, the second input is coupled to the third output, etc. The last input is coupled to the first output. For rotation in the opposite direction, the first input is coupled to the last output, the second input is coupled to the first output, the third input is coupled to the second output, etc. With identical stacked boards, the select lines will therefore sequentially refer to the boards in the stack.

The invention also provides a side control line, which informs the stacked boards whether they are stacked on the front or back of the base board. The side control line on the front of the base board is held inactive, and the side control line on the rear of the board is help active. The side control line is communicated to each stacked board, and is supplied to an address control input of the board address decoder. Preferably, the address control input is an address offset control input, which, when enabled by an active side control line signal, adds a predetermined address offset value to the decoded address. The address control input thus modifies the address decoding of the decoder, so that boards on the front and rear of the base board that could be accessed by the same select line will have different address locations, thereby avoiding any address overlap. Thus each board can be accessed individually, even though the stacked boards may be identical. For example, using three select lines together with a side control line allows up to three identical boards to be stacked on each of the front and rear of a base board.

According to another feature of the invention, the stackable board includes a first port coupled to its first connector, and a second port coupled to its second port. The side control line is used to control the configuration of the ports, i.e. which port is an input port, and which is an output port. This allows stackable boards to be stacked on both the front and rear of a baseboard, with the ports being correctly configured for input and output.

According to another feature of the invention, the stackable board includes priority lines that control whether the board is enabled to output data onto a common bus. Each stackable board is assigned a priority level, and the stackable board can only output data if no other higher priority levels are enabled.

BRIEF DESCRIPTION OF THE DRAWINGS

To enable the invention to be more fully understood, an embodiment of the invention will now be described by way of example, with reference to the accompanying drawings, in which.

DESCRIPTION OF AN ILLUSTRATIVE EMBODIMENT

Figure 6:
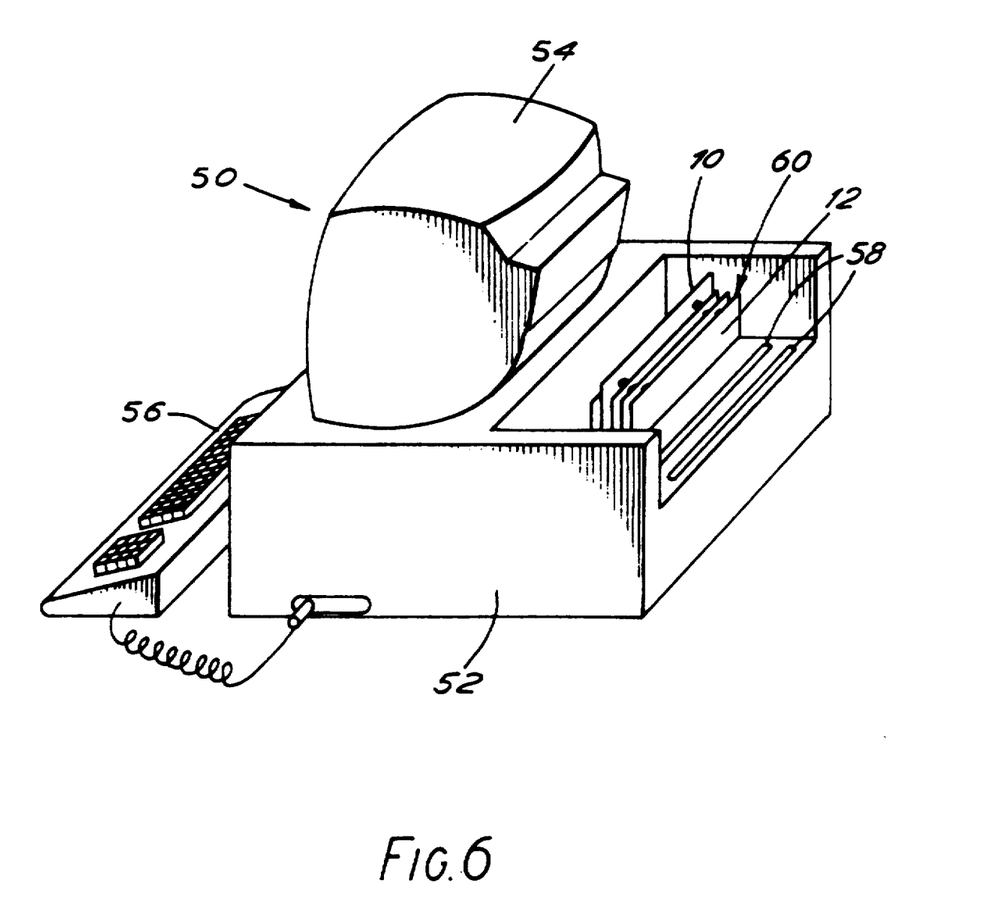
FIG. 6 is an illustration of a personal computer to which the base and daughter boards are fitted.

Referring to FIG. 6, a conventional computer 50 comprises a computer system unit 52, a video display monitor 54, and a keyboard 56. The computer system unit 52 has expansion slots 58 into which add-on boards may be plugged, such as memory expansion boards and peripheral interface boards.

In the present embodiment a video processor adaptor 60 is plugged into one of the expansion slots 58. The video processor adaptor comprises a video processor base board 10 that plugs into the expansion slot 58, and four video framestore daughter boards 12.

Figure 1:
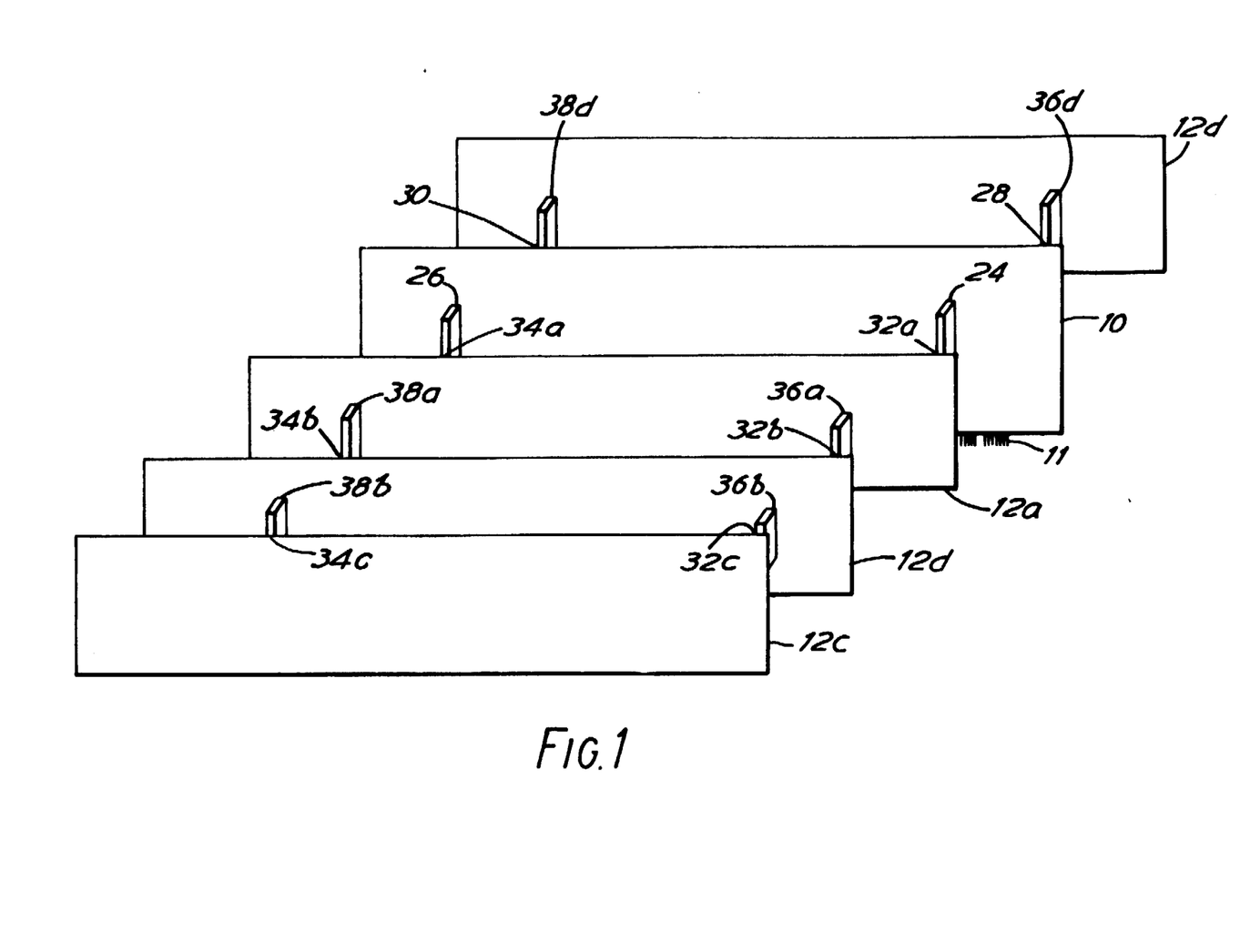
FIG. 1 is a perspective view of a computer base board carrying four stacked daughter boards.
Figure 2:
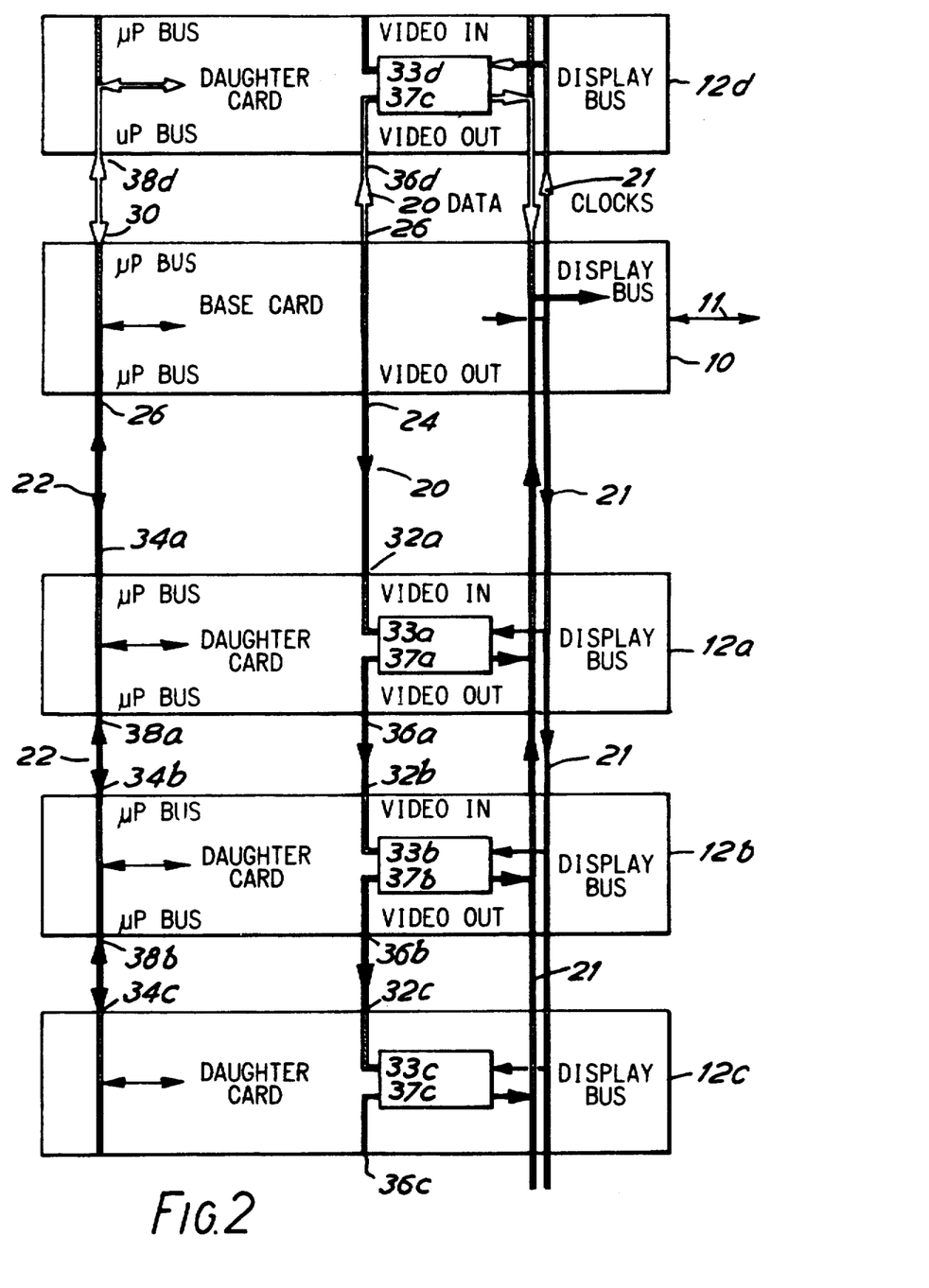
FIG. 2 is a diagram showing the connections between the circuit boards of FIG. 1.

Referring to FIGS. 1 and 2, the video processor computer base board 10 carries the four stackable framestore daughter boards 12a, 12b, 12c and 12d, respectively. Three of the daughter boards 12a, 12b and 12c are stacked on the front side of the base board 10, and the fourth daughter board 12d is connected to the rear side.

The base board 10 includes a plug portion 11 that is plugged into the expansion slot 58. The connections between the video adaptor boards are in the form of a video bus 20 carrying digital video signals between daughter boards 12, a display bus 21 to which each daughter board 12 can send video data, and a processor bus 22 carrying processor addressing and data. The base board 10 carries a front video bus base connector 24 carrying the video and display buses and a front processor bus base connector 26 on its front face, and a rear video bus base connector 28 carrying the video and display buses and a rear processor bus base connector 30 on its rear face.

Each daughter board 12 carries a respective rear video bus connector 32 and a respective rear processor bus first connector 34 on its rear face, and a respective front video bus connector 36 and a respective front processor bus second connector 38 on its front face. The rear video bus connector 32 feeds the video bus into a first video bus port 33, and the front video bus connector 36 feeds the video bus into a second video bus port. The display bus 21 is connected directly between the front and rear video bus connectors.

Figure 7:
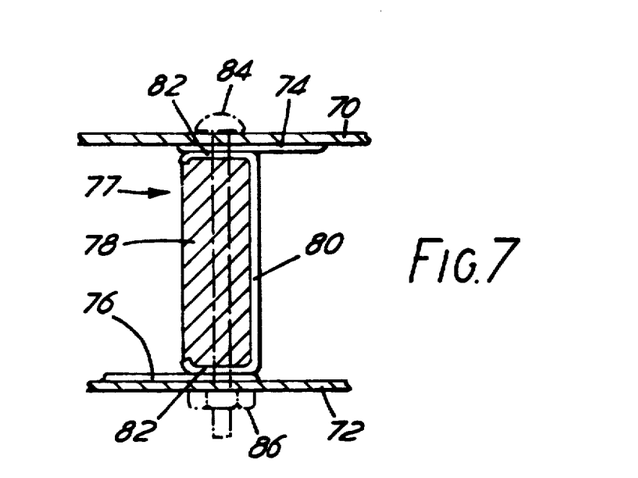
FIG. 7 is a sectional view illustrating generally a surface mounted connection.

The connetors are 42 way surface mounted connectors. Referring to FIG. 7, a general connection between two surface mounted connectors is shown. A first general board 70 carries a surface mounted connector in form of conductive printed circuit pads 74. A second general board 72 carries a similar surface mounted connector in the form of conductive pads 76 arranged opposite and in register with the pads 74. A connector block 77 comprising an insulating spacer 78 carrying conductive strips 80 fits between the surface mounted connectors. The strip 80 has ends 82 that are bent over to make contact with the pads 74 and 76. The connector block 77 is secured in position by bolts 84 passing through the first board 70, the block 77 and the second board 72, and secured by nuts 82.

The rear video bus connector 32a and the rear processor bus connector 34a of the first daughter board 12a connect respectively to the front video bus connector 24 and the front processor bus connector 26 of the base board 10. The second daughter board 12b is similarly stacked on the rear of the first daughter board 12a, with the rear video bus connector 32b connected to the front video bus connectors 36a and the rear processor bus connector 34b connected to the front processor bus connector 38a. The third daughter board 12c is stacked on the rear of the second daughter board 12b, in similar fashion.

The front video bus connector 36d and the front processor bus connector 38d of the fourth daughter board 12d connect respectively to the rear video bus connector 28 and the rear processor bus connector 30 of the base board 10.

The boards are therefore stacked front to rear. To ensure correct stacking, the front connectors on each board may be male connectors and the rear connectors on each board female connectors, if surface mounted connectors are not used.

Figure 3:
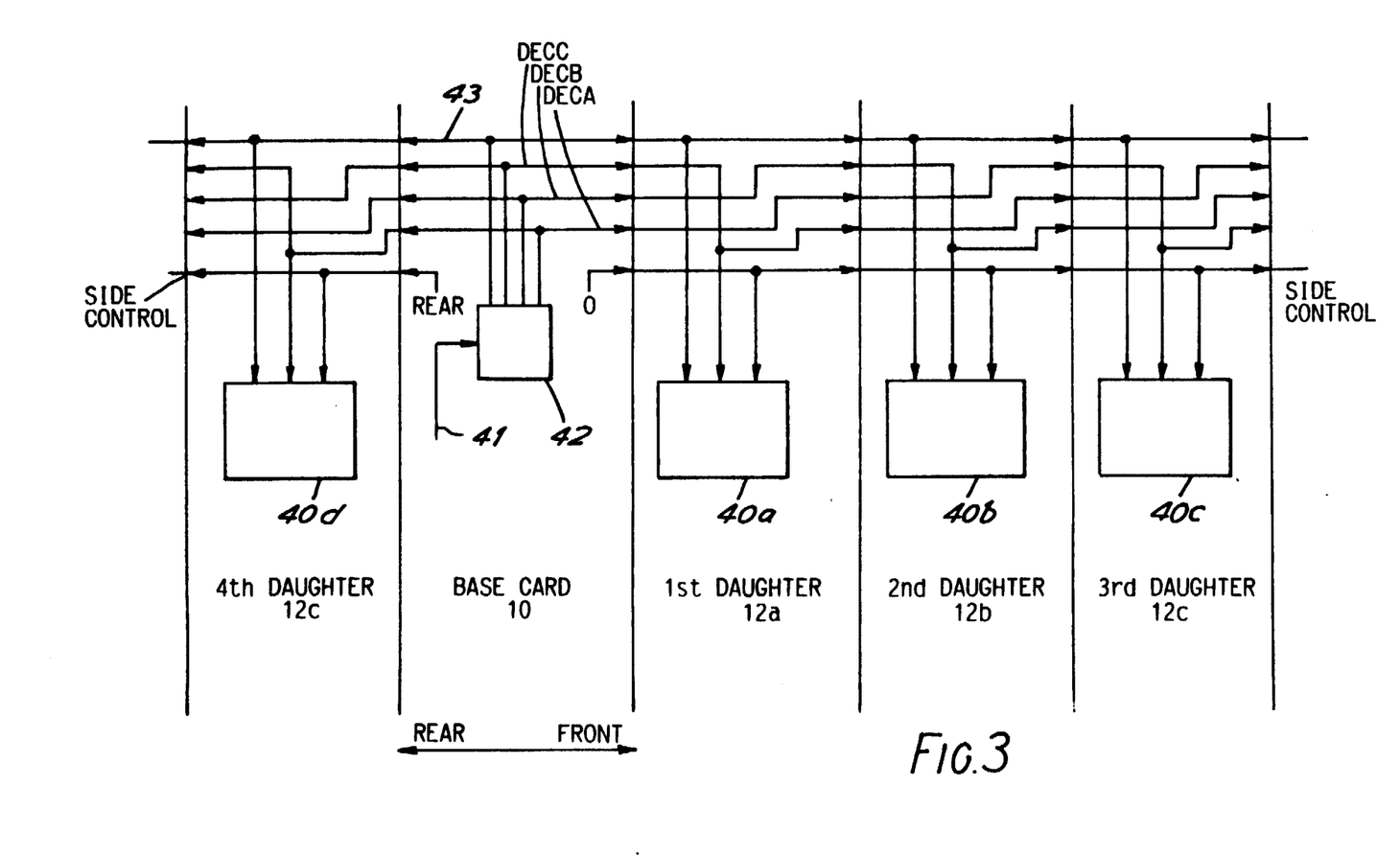
FIG. 3 is a diagram showing the address bus modifications applied to the bus by each daughter board.

Each daughter board 12 includes a respective address decoder 40 connected to the processor bus passing through the daughter board. The address decoder 40 is of a conventional type for decoding and comparing addresses for access to the board's resources. The base board 10 can access any of the daughter boards 12 by means of memory mapped addressing. Referring to FIG. 3, the addresses are supplied by an address bus 41, shown diagrammatically as a single line. The base board 10 includes an address decoder 42 that partially decodes the most significant bits of address data into three exclusive select lines, labelled DECA, DECB and DECC. The remaining address bits are supplied to address bus lines 43, shown diagrammatically as a single line. The select lines are supplied to both the front and rear processor bus connectors 26, 30 of the base board. For each daughter board the corresponding address lines at the rear processor connector are generally labelled DECA', DECB' and DECC' respectively, and the address lines at the front processor connector are generally labelled DECA'', DECB'' and DECC'', respectively, see FIG. 4.

The front and rear processor bus connectors 26, 30 respectively, on the base board 10 are also supplied with signals that connect to a SIDE control line that is communicated to each stacked daughter board 12. The SIDE line connected to the front processor bus connector 26 is always supplied with a zero (or null) signal, which indicates to the first, second and third daughter boards 12a, 12b and 12c, respectively, that they are stacked on the front side of the base board 10. The SIDE line connected to the rear processor bus connector 30 is always supplied with a REAR (or active) signal, which indicates to the fourth daughter board 12d that it is connected on the rear side of the base board 10.

Referring to FIG. 2, it can be seen that the video-in port for the video bus 20 on the first daughter board is the respective first port 33a, and the video-out port for the video bus 20 is the respective second port 37. This is the same for the second and third daughter boards 12b and 12c, respectively. However, the video-in port for the video bus 20 on the fourth daughter board 12 is the respective second port 37d, and the video-out port is the respective first port 33d. This is caused by the connections to the fourth daughter board 12d being reversed, as it is stacked on the rear side of the base board 10. The SIDE control line is used by each daughter board 12 to determine which port is the video-in port and which port is the video-out port. When the SIDE control line is active, the daughter board configures its first port 33 to be an output video bus port, and the second port 37 to be an input video bus port. When the SIDE control line is null, the daughter board configures its first port 33 to be an input video bus port, and its second port 37 to be an output video bus port.

Figure 4:
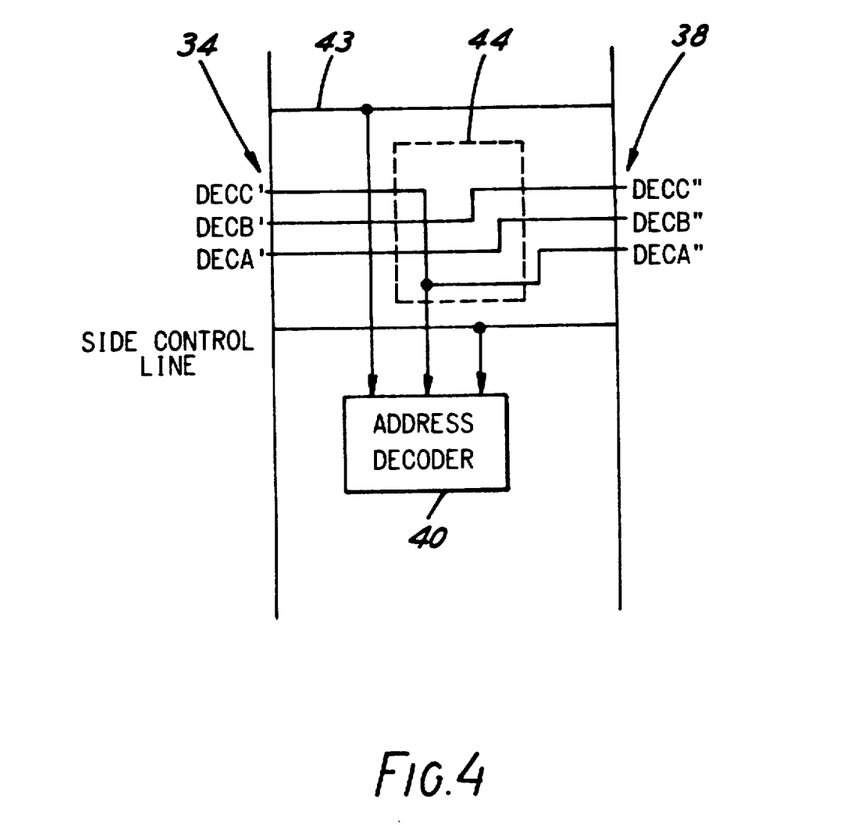
FIG. 4 shows a detail of the address bus modification in FIG. 3.

The daughter boards 12 are all identical, and it is to be noted in particular that the address decoders on each daughter board are identically configured. Referring to FIG. 4, each daughter board 12 includes a respective means 44 for modifying the address lines between the front and rear processor connectors 38, 34 respectively. In the present embodiment, the means comprises a rotation network that operates on the DECA, DECB and DECC lines, according to the following algorithm:

DECA"=DECC'

DECB"=DECA'

DECC"=DECB'.

The DECC' (ie. DECA") line is used as a daughter board select line for the particular board. The DECC' line is coupled to an enable control input of the address decoder 40. When this line is active, the address decoder 40 on the daughter board is enabled. The SIDE line is also connected to an address control input of the decoder 40. When the SIDE line is active, the address decoder decodes addresses differently from those decoded when the SIDE line is inactive. The address control input is an address offset control input when the SIDE line is active, a predetermined address offset value is added to addresses being decoded from the bus.

Referring to FIG. 3, it can be seen that when the DECC line is enabled by the base board, the DECC' line of the first daughter board 12a will be active. When the DECB line is enabled the DECC' line of the second daughter board 12b will be active. Similarly, when the DECA line is enabled the DECC' lines of the third and fourth daughter boards 12c, 12d, respectively, will be enabled. The REAR signal on the SIDE line connected to the fourth daughter board 12d causes the address decoder 40d to decode addressing differently from the decoder 40c, thereby avoiding any address conflicts between the third and fourth daughter boards 12c, 12d when the DECA line is enabled by the base board 10.

The addressing by the base board therefore refers to a position of a board in the daughter board stack, rather than to a unique board. This allows identical daughter boards to be used, each being automatically addressed, depending on its position in the stack.

It is to be noted that a further two identical daughter boards could be stacked on the rear of the fourth daughter board 12d, without requiring any hardware modifications. These extra boards would be accessed by enabling the DECB and DECC lines on the base board. The REAR signal supplied by the rear SIDE line would ensure that the two extra boards would not conflict with the addresses of the first and second daughter boards 12a, 12b respectively.

Figure 8:
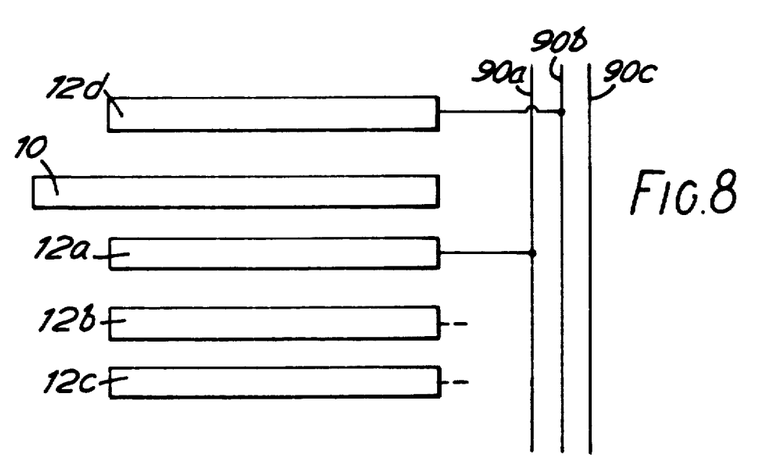
FIG. 8 is a diagrammatic view showing the priority lines for the display bus.
Figure 9:
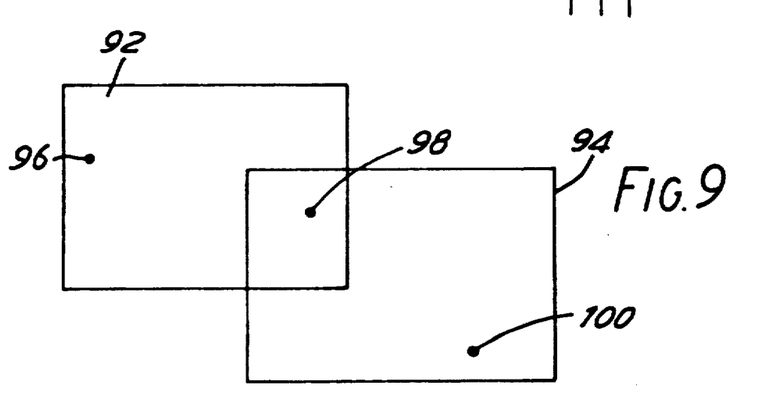
FIG. 9 shows an example of the use of the priority lines.

Each daughter board 12 can output video data to the display bus 21 independently of the other daughter boards 12. Referring to FIG. 8, to prevent two daughter boards 12 from outputting display bus video data at the same time, the display bus includes three exclusive priority lines 90a, 90b and 90c. The lowest priority level is zero, when each of the priority lines 90 is zero, and the highest priority level is three, when the third priority line 90c is active. Each of the four daughter boards 12 is assigned a priority level by the base card 10. When a daughter board 12 wishes to output data to the display bus, its control logic enables its associated priority line to be active, and checks higher priority levels to determine whether it has the highest active priority. If a higher priority line is active, the control logic prevents the daughter board from outputting its data to the display bus 21, as the daughter board with the higher priority should have access to the display bus. If no higher priority line is active, the daughter board 12 is enabled to output its data to the display bus. For example, referring to FIGS. 8 and 9, say that the fourth daughter board 12d has a priority level of two, and the first daughter board 12a has a priority level of one. The fourth daughter board 12d contains pixel data for a first video window 92, and the first daughter board 12a contains pixel data for a second video window 94 that partially overlaps the first video window 92. Pixel coordinates are supplied by the base card 10 to the daughter boards 12. For pixel coordinates 96 inside the first window 92 but outside the second video window 94, the fourth daughter board outputs video pixel data. For pixel co-ordinates 98 inside both the first window 92 and the second window 94, the fourth daughter board 12d has a higher priority level than the first daughter board 12a, and so it is the fourth daughter board 12d that supplies video pixel data. For pixel co-ordinates 100 outside the first window 92 and inside the second window 94, the first daughter board 12a supplies vide pixel data.

With three priority lines 90, only four daughter boards may be enabled to supply data to the display bus 21. Any other daughter boards must be disabled. The priorities may be reassigned between the boards to allow access to all of the boards.

In use, when the base board is reset, it automatically scans the addresses to ascertain in which positions daughter boards exist. Each daughter board has an identity bit stored at a certain location, for example at location 00H. By interrogating the location 00H for each possible board position, the base board can detect the presence of a board by its identity bit.

In the present embodiment the daughter boards 12 are identical, and this is indicated by the boards 12 all having the same identity bit. Other boards may also be stacked, and if these boards perform different operations from the framestore boards 12, this will be indicated by the present of a different identity bit. The base board can therefore compile its own table of which boards are in the stack, and their stack positions, by sequentially interrogating the identity bit of each board.

Figure 5:
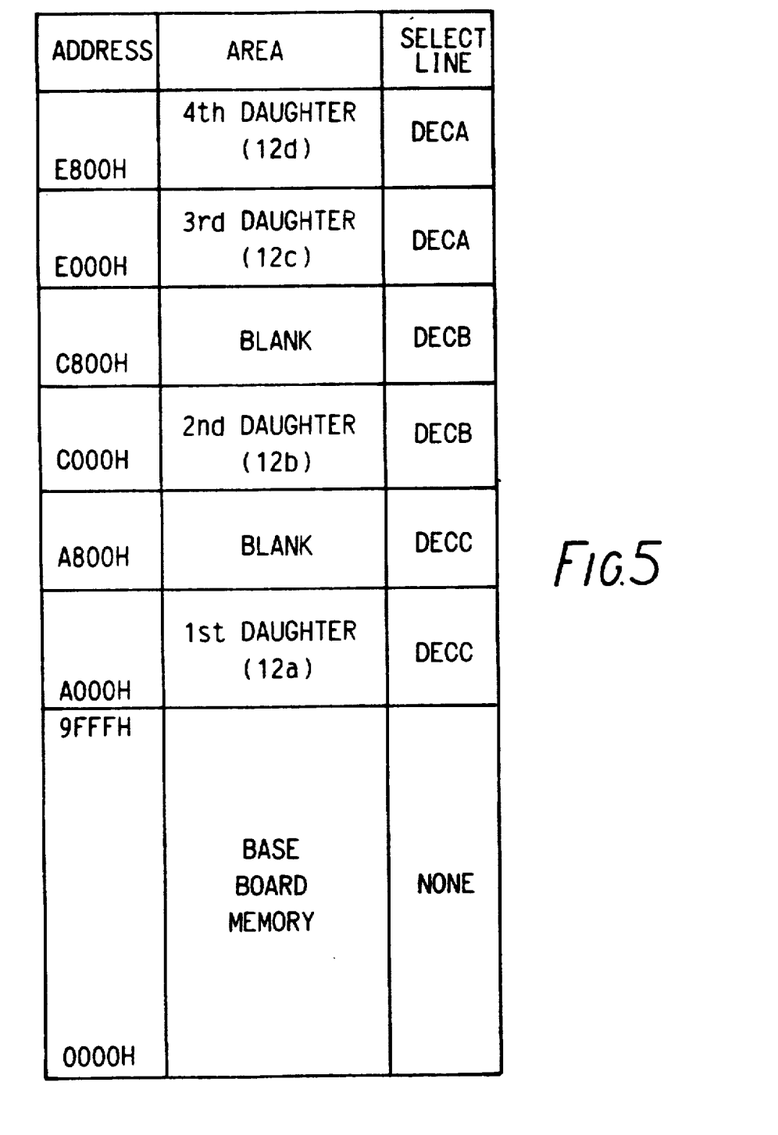
FIG. 5 is a table showing a memory map of the computer board system.

FIG. 5 shows an address map and select line details for the daughter and base boards, as seen by the base board. In the present embodiment, addresses on the base board in the range 0000H to 9FFFH are used for addressing on the board. The remaining addresses A000H to FFFFH are used for memory mapped addressing of the daughter boards. The lines DECA, DECB and DECC are selected exclusively by addresses above A000H, C000H and E000H, respectively. The REAR signal introduces an offset of 0800H into the address decoders on the daughter boards. Addresses in the ranges C800H to DFFFH and A800H to BFFFH refer to the two extra boards that could be stacked on the rear of the fourth daughter board 12d. In the present embodiment, these extra daughter boards are not fitted, and the base board would detect this by the absence of an identity bit at location 00H for each extra board position.

It will be appreciated that the three select lines DECA, DECB and DECC allow three identical daughter boards to be stacked on each of the front and rear sides of the base board. Where less boards are used, these can be stacked on either side of the base board without affecting operation of the addressing system. This is particularly useful in situations where there may not be much physical room in which to stack daughter boards on one side of the base board.

It will also be appreciated that if the daughter boards are to be stacked on only one side of the base board, then the SIDE line signal may be omitted. Similarly, more select lines may be provided to allow a greater number of daughter boards to be stacked.

Although the embodiment described usesd address line rotation as a means for modifying the address lines passing through each daughter board, other embodiments may use other means for modifying the address lines. For example, an arithmetic adder or subtracter could be used, to add or subtract a PAGE value on each daughter board. The addressing of the daughter boards on each side of the base board would then occur in increments of the PAGE value.

I claim:

1. A stackable computer board comprising:
   a stackable board;
   first connector means on said stackable board for connecting said stackable board to a first other stackable board;
   second connector means on said stackable board for connecting said stackable board to a second other stackable board;
   bus means coupled between said first and second connector means on said stackable board for communicating data and address information therebetween, said address information including a first component for determining a stackable board to be addressed, and a second component for determining a local address;
   decoder means coupled to said bus means on said stackable board for determining from said first component whether said address information corresponds to said stackable board and for decoding the local address of said second component for access to said stackable board; and
   means in said bus means connected between said decoder means and one of said first and second connector means and operable in accordance with a predetermined algorithm for causing the address information carried by signal lines of said bus means at said second connector means to be different from that at said first connector means.

2. A stackable computer board according to claim 1, wherein said bus means includes a plurality of address lines for communicating said first component of said address information and connecting an array of contacts of said first connector means to a like array of contacts of said second connector means, and wherein said means operable in accordance with said predetermined algorithm causes each of said plurality of address lines to be connected to one of said contacts of said second connector means which is offset by a predetermined number of contact positions in the contact array of said second connector means relative to the position in the contact array of one of said contacts of said first connector means to which the same address line is connected.

3. A stackable computer board according to claim 2, wherein said plurality of address lines in said bus means include a number of exclusive select lines, said predetermined algorithm being such that the respective contacts of said first and second connector means to which each said exclusive select line is connected are offset relative to each other by one position.

4. A stackable computer board according to claim 3, wherein said decoder means has an enable control input, one of said select lines in said bus means being coupled to said enable control input of said decoder means, wherein when said one select line is active said decoder means is enabled to decode addresses from said bus means, and when said one select line is inactive said decoder means is disabled from decoding addresses.

5. A stackable computer board according to claim 4, wherein said decoder means has an address control input, and said bus means includes a side control line coupled between said first and second connector means and coupled to said address control input of said decoder means, wherein when said side control line is active said decoder means performs address decoding differently than when said side control line is inactive.

6. A stackable computer board according to claim 5, wherein said address control input of said decoder means is an address offset control input, wherein when said side control line is active a predetermined address offset value is added to said local address of said second component before said decoding thereof.

7. A stackable computer board according to claim 1, wherein said first and second connector means are on opposite faces of said stackable board.

8. A stackable computer board comprising: a baseboard, said baseboard including front connector means on a front face thereof for connecting said baseboard to a stackable board mounted on said front face thereof, rear connector means on a rear face thereof for connecting said baseboard to a stackable board mounted on said rear face thereof, and means for supplying to said front and rear connector means respective side control signals which are logical complements of each other, each said stackable board including:
   a board member;
   first connector means on said board member for connecting said stackable board to one of said front and rear connector means on said baseboard;
   second connector means on said board member for connecting said board member to another computer board;
   bus means coupled between said first and second connector means on said board member for communicating data and address information therebetween, said bus means including a side control line for communicating one of said side control signals from said baseboard between said first and second connector means; and
   address determining means coupled to said bus means on said board member for decoding a local address in said address information, said determining means including an address control input coupled to said side control line in said bus, said determining means performing a first form of address decoding when said address control input is active and a second form of address decoding when said address control input is inactive.

9. A stackable computer board according to claim 8, wherein said address control input of said address determining means is an address offset control input, wherein when said side control line is active, a predetermined address offset value is added to said local address being decoded from said bus means.

10. A stackable computer board according to claim 8, wherein said address information includes a first component for determining a board to be addressed and a second component for determining a local address, and wherein said bus means on said board member includes address modifying means for modifying in accordance with a predetermined algorithm said first component of said address information sent between said first and second connectors.

11. A stackable computer board according to claim 10, wherein said address modifying means includes means in said bus means connected between said address determining means and one of said first and second connector means and operable in accordance with said predetermined algorithm for causing the address information carried by signal lines of said bus means at said second connector means to be different from that at said first connector means.

12. A stackable computer board according to claim 11, wherein said address lines in said bus means include a number of exclusive select lines connecting an array of contacts of said first connector means to a like array of contacts of said second connector means, and wherein said means operable in accordance with said predetermined algorithm is such that the respective contacts of said first and second connector means to which each said exclusive select line is connected are offset relative to each other in said arrays by one position.

13. A stackable computer board according to claim 12, wherein said determining means has an enable control input, and one of said select lines of said bus means is coupled to said enable control input of said determining means, wherein when said one select line is active said address decoder is enabled to decode said local address from said bus means, and when said one select line is inactive said address decoder is disabled from decoding said local address.

14. A stackable computer board according to claim 8, wherein said first and second connector means are on opposite faces of said board member.

15. A computer board assembly, comprising: a base board which includes a base board member and a first base connector on said base board member; and a first stackable computer board which includes a stackable board member, first connector means on said stackable board member for connecting said stackable board member to a first other board, second connector means on said stackable board member for connecting said stackable board member to a second other board, bus means coupled between said first and second connector means on said stackable board member for communicating data and address information therebetween, said address information including a first component for determining a stackable board member to be addressed and a second component for determining a local address, address determining means coupled to said bus means on said stackable board member for determining whether said address information corresponds to said stackable board member and for decoding said local address of said second component for access to said stackable board member, and address modifying means in said bus means for modifying in accordance with a predetermined algorithm said first component of said address information as said address information is sent between said first and second connector means, said first connector means being connected to said first base connector of said base board member.

16. A computer board assembly according to claim 15, further including a second said stackable board member, said first connector means of said second stackable board member being connected to said second connector means of said first-mentioned stackable board member.

17. A computer board assembly according to claim 16, wherein said first-mentioned and second stackable board members are identical.

18. A computer board assembly according to claim 15, wherein said base board member includes a second base connector on an opposite face of said base board member from said first base connector, and including a second said stackable board member, said second connector means of said second stackable board member being connected to said second base connector on said base board member.

19. A computer board assembly according to claim 18, wherein said first-mentioned and second stackable board members are identical.

20. A computer board assembly comprising:
a baseboard which includes:
a baseboard member having a front face and a rear face;
front connector means on said front face of said baseboard member for connecting said baseboard member to a stackable computer board;
rear connector means on said rear face of said baseboard member for connecting said baseboard member to a stackable computer board; and
means on said base board member for supplying to said front and rear connector means respective side control signals which are logical complements of each other;
said computer board assembly further including a stackable computer board which is mounted on said front face of said base board member and includes:
a stackable board member,
first connector means on said stackable board member for connecting said stackable board member to another board, said first connector means being connected to said front connector means of said base board member;
second connector means on said stackable board member for connecting said stackable board member to another board;
bus means coupled between said first and second connector means on said stackable board member for communicating data and address information therebetween, said bus means including a side control line for communicating said side control signal from said front connector means between said first and second connector means; and
address decoding means coupled to said bus means on said stackable board member for decoding a local address for access to said stackable board member, said address decoding means including an address control input coupled to said side control line in said bus, said address decoding means performing a first form of address decoding when said address control input is active and a second form of address decoding when said address control input is inactive.

21. A computer board assembly according to claim 20, further comprising a second said stackable board member, said first connector means of said second stackable board member being connected to said second connector means of said first stackable board member.

22. A computer board assembly according to claim 21, wherein said first and second stackable board members are identical.

23. A computer board assembly according to claim 20, further comprising a second said stackable board member mounted on said rear face of said base board, said second connector means of said second stackable board member being connected to said rear connector means of said base board member.

24. A computer board assembly according to claim 23, wherein said base board member supplies to one of said front and rear connector means a continuously active side control line signal, and supplies to the other of said front and rear connector means a continuously inactive side control line signal.

25. A computer board assembly according to claim 23, wherein said first and second stackable board members are identical.

26. A stackable computer board comprising a board member, first connector means on said board member for connecting said board member to a first other board, second connector means on said board member for connecting said board member to a second other board, a first port on said board member which is coupled to said first connector means and can be configured as one of an input port and an output port, a second port on said board member which is coupled to said second connector means and can be configured as one of an input port and an output port, a common side control line on said board member coupled between said first and second connector means, and control logic coupled to said common side control line for configuring said first and second ports in dependence on the state of said side control line.

27. A stackable computer board according to claim 26, wherein when said common side control line is active, said first port is configured as an output port and said second port is configured as an input port, and when said common control line is inactive, said first port is configured as an input port and said second port is configured as an output port.

* * * * *